United States Patent
Van De Sluis et al.

(10) Patent No.: US 12,035,437 B2
(45) Date of Patent: Jul. 9, 2024

(54) ADJUST LIGHT SOURCES FROM GROW LIGHT SETTINGS TO OPERATOR LIGHT SETTINGS BASED ON A DETERMINED ATTENTION AREA

(71) Applicant: SIGNIFY HOLDING B.V., Eindhoven (NL)

(72) Inventors: Bartel Marinus Van De Sluis, Eindhoven (NL); Marcellinus Petrus Carolus Michael Krijn, Eindhoven (NL); Dragan Sekulovski, Eindhoven (NL); Silvia Maria Booij, Eindhoven (NL); Celine Catherine Sarah Nicole, Eindhoven (NL); Joris Jan Vrehen, Waalre (NL); Rob Franciscus Maria Van Elmpt, Roermond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 85 days.

(21) Appl. No.: 17/774,259

(22) PCT Filed: Nov. 3, 2020

(86) PCT No.: PCT/EP2020/080774
§ 371 (c)(1),
(2) Date: May 4, 2022

(87) PCT Pub. No.: WO2021/089521
PCT Pub. Date: May 14, 2021

(65) Prior Publication Data
US 2022/0353974 A1    Nov. 3, 2022

(30) Foreign Application Priority Data
Nov. 7, 2019 (EP) .................................... 19207574

(51) Int. Cl.
*H05B 47/16* (2020.01)
*G06F 3/01* (2006.01)
(Continued)

(52) U.S. Cl.
CPC ........... *H05B 47/125* (2020.01); *G06F 3/011* (2013.01); *H05B 47/13* (2020.01); *H05B 47/16* (2020.01); *H05B 47/17* (2020.01); *A01G 9/249* (2019.05)

(58) Field of Classification Search
CPC ........ H05B 47/13; H05B 47/16; H05B 47/17; H05B 47/115; H05B 47/125; A01G 7/06;
(Continued)

(56) References Cited

U.S. PATENT DOCUMENTS

| 9,392,753 | B2* | 7/2016 | Krijn | ...................... | H05B 47/11 |
| 10,231,304 | B2* | 3/2019 | Fredricks | ............... | H05B 47/19 |

(Continued)

FOREIGN PATENT DOCUMENTS

| CN | 103104839 A | 5/2013 |
| WO | 2006111934 A1 | 10/2006 |

(Continued)

*Primary Examiner* — Tung X Le (57) ABSTRACT

A system for adjusting one or more settings of one or more identified light sources is configured to receive input from one or more sensors (21-23, 26-28), determine an attention area of an operator (81) from the input, identify one or more light sources (13,14) illuminating the attention area, and adjust one or more settings of the one or more identified light sources from grow light settings to operator light settings.

15 Claims, 5 Drawing Sheets

(51) Int. Cl.
*H05B 47/125* (2020.01)
*H05B 47/13* (2020.01)
*H05B 47/17* (2020.01)
*A01G 9/24* (2006.01)

(58) Field of Classification Search
CPC . A01G 7/045; A01G 9/18; A01G 9/20; A01G 9/249
See application file for complete search history.

(56) References Cited

U.S. PATENT DOCUMENTS

| | | | |
|---|---|---|---|
| 10,743,480 B2 * | 8/2020 | Probasco | A01G 7/045 |
| 11,632,915 B2 * | 4/2023 | Bogner | A01G 9/246 |
| | | | 47/17 |
| 2010/0039804 A1 | 2/2010 | Budde et al. | |
| 2015/0289328 A1 * | 10/2015 | Conrad | H05B 47/11 |
| | | | 315/152 |
| 2015/0289345 A1 | 10/2015 | Lee et al. | |
| 2016/0007544 A1 * | 1/2016 | Takashima | A01G 7/02 |
| | | | 47/1.01 R |
| 2016/0235013 A1 | 8/2016 | Pohjanvouri et al. | |
| 2018/0014475 A1 * | 1/2018 | Gomi | A01G 7/045 |
| 2018/0173191 A1 | 6/2018 | Hillberg et al. | |
| 2020/0053850 A1 * | 2/2020 | Fredricks | H05B 47/19 |
| 2021/0307259 A1 * | 10/2021 | Setlur | A01G 9/26 |

FOREIGN PATENT DOCUMENTS

| | | |
|---|---|---|
| WO | 2007110791 A1 | 10/2007 |
| WO | 2014188303 A1 | 11/2014 |

* cited by examiner

ADJUST LIGHT SOURCES FROM GROW LIGHT SETTINGS TO OPERATOR LIGHT SETTINGS BASED ON A DETERMINED ATTENTION AREA

CROSS-REFERENCE TO PRIOR APPLICATIONS

This application is the U.S. National Phase application under 35 U.S.C. § 371 of International Application No. PCT/EP2020/080774, filed on Nov. 3, 2020, which claims the benefit of European Patent Application No. 19207574.5, filed on Nov. 7, 2019. These applications are hereby incorporated by reference herein.

FIELD OF THE INVENTION

The invention relates to a system for adjusting one or more settings of one or more identified light sources.

The invention further relates to a method of adjusting one or more settings of one or more identified light sources.

The invention also relates to a computer program product enabling a computer system to perform such methods.

BACKGROUND OF THE INVENTION

Growing of crops in greenhouses has been common practice for a long time. For the photosynthesis of the plants, the sun is being used as a main source of light. In recent years the dark periods of the day have been filled in with artificial lighting, to boost the grow of the crops. First HID lamps were used. The HID lamps are in the process of being replaced by LED. Advantages of LED are the capability to spectrally tune the LEDs according to the plants and humans desire, the higher efficacy of LED as compared to HID, and the fact that they can be instantaneously dimmed or boosted.

Another trend that is increasing in popularity is the grow of crops in vertical farms. The world population is expected to grow from 6.5 billion now to about 9 billion in 2050. Society is rapidly becoming predominantly urban. This will place major constraints on the availability of food and clean water. The space available for food production will become scarcer. Innovation in production methods is needed to deliver higher yields from smaller footprints, while becoming more sustainable (minimum use of energy and water). Producing food in closed environments such as vertical farms is a method to meet these demands.

Vertical farms are typically almost completely sealed-from-the outside cells where the climate can be 100% controlled, without being influenced by the climate outside of the cells, although normally, fresh air is still introduced from outside. Temperature, CO2 level, irrigation, and lighting can be controlled. In vertical farms (a.k.a. plant factories and city farms), food is grown in multiple layers, making much better use of the available space as compared to outdoor grow or grow in greenhouses. This implies that daylight will not be able to reach all plants and nearly all the light must come from artificial lighting. Horticulture lighting control systems are therefore becoming more and more advanced, just like horticulture climate control systems.

The optimal grow conditions (climate conditions and light conditions) are described in a so-called grow recipe or grow protocol. However, those grow lighting conditions are optimized for plants (or animals) and not for people. Horticulture systems still depend on human operators executing various tasks (e.g. inspection, harvesting, technical maintenance).

With horticulture grow light recipes becoming more sophisticated, photobiological eye safety also becomes a factor to take into consideration. The amount of light coming from one LED is increasing over time. That is good for growing plants, but it could be a safety issue for humans. Moreover, the amount of blue light that can be generated can be harmful to the eye when the eye is too close to the light sources for a too long time period. This can be mitigated by wearing eye protective glasses that reduce the amount of light in the blue part of the spectrum (400-500 nm). Another problem is the high light levels and the non-white spectrum that can both cause discomfort. Furthermore, experiments are being done with UV-A and UV-B light to promote plant quality aspects. The safety of this light for human operators still needs to be further assessed and investigated.

The safety factor is addressed by US 2016/0235013 A1, for example. US 2016/0235013 A1 discloses a method for position-based management of a plurality of plants in a controlled environment which are subject to light emitted by at least one artificial lighting arrangement. The at least one artificial lighting arrangement is arranged to control grow of the plurality of plants based on a position of a mobile device, e.g. to stop UV radiation.

A drawback of the method of US 2016/0235013 A1 is that by switching from operator light setting to grow light settings, the grow of the plants is affected. Application of the disclosed method would normally result in the use of too much operator light and therefore unnecessarily affect the grow of the plants.

SUMMARY OF THE INVENTION

It is a first object of the invention to provide a system, which is able to limit the influence of the use of operator light on the grow of plants.

It is a second object of the invention to provide a method, which is able to limit the influence of the use of operator light on the grow of plants.

The invention is determined by the claims appended hereto.

In a first aspect disclosed herein, a system for adjusting one or more settings of one or more identified light sources comprises at least one input interface, at least one control interface, and at least one processor configured to use said at least one input interface to receive input from one or more sensors, determine an attention area of an operator from said input, identify one or more light sources illuminating said attention area, and use said at least one control interface to adjust one or more settings of said one or more identified light sources from grow light settings to operator light settings.

By switching the (horticulture) light sources from a grow light setting to an operator light setting in only the attention area of the operator, the grow of the plants is disturbed as little as possible. If the operator moves away, the grow protocol can be resumed. The attention area may be determined based on the position of the eyes of the operator, for example. Other light sources can be switched off, dimmed or changed in spectrum dependent on the attention area of the operator for safety reasons. These changes in light level are preferably such that the grow of the plants is disturbed as little as possible. Said attention area may be (a part of or a segment of) a layer of a rack of a vertical horticulture farm, for example.

The one or more sensors may comprise RF-based sensing nodes, PIR sensors, or one or more normal and/or IR cameras, for example. One or more cameras may be embedded in glasses or a hat worn by the operator, for example.

Said at least one processor may be configured to use said at least one input interface to receive further input from said one or more sensors and/or one or more further sensors, determine that no further attention by said operator is needed in said attention area from said further input, and use said at least one control interface to adjust said one or more settings of said one or more identified light sources from said operator light settings to said grow light settings or to new grow light settings upon determining that no further attention by said operator is needed in said attention area.

Thus, if sensors detect that no further operator attention is needed in the attention area, then the system can switch back to the previous grow light or switch to new grow light settings to disturb the grow of the plants as little as possible. If light emitted by a light source can potentially damage an operator's eyes or can potentially be very uncomfortable (e.g. high intensity grow light) and the operator can see this light source or this light source is near enough to damage or be uncomfortable to the operator's eyes when operator attention is needed in that attention area, then this light source is preferably identified as one of the light sources illuminating the attention area. In this way, it is prevented that this light source reverts to grow light settings when it can still damage the operator's eyes or can still be very uncomfortable.

Said at least one processor may be configured to determine a duration of use of said operator light settings, and determine said new grow light settings and/or a period during which said grow light settings or said new grow light settings need to be used after applying said operator light settings based on said grow light settings, said operator light settings and said duration. In this way, the grow protocol is not simply resumed, but the interruption is compensated for based on how long the operator light settings were used and the differences between the operator light settings and the grow light settings. Possibly the grow protocol is only adjusted if the operator light setting duration has exceeded a pre-defined threshold. In a simpler implementation, compensating light settings may be generated without taking the exact settings of the operator light into account. In this case, the compensating light settings could be based only on operator light duration and not on the exact operator light settings.

Said at least one processor may be configured to determine a further attention area of said operator from said further input, identify one or more further light sources illuminating said further attention area, and use said at least one control interface to adjust one or more settings of said one or more identified further light sources from further grow light settings to further operator light settings. When no further operator attention is needed in the attention area, the reason is often that the operator has changed its attention to other plants/crops, i.e. has a further attention area which needs to be illuminated with suitable light to allow the operator to examine and/or care for further plants/crops.

Said at least one processor may be configured to determine a type of attention required from said operator in said attention area and determine said operator light settings based on said determined type of attention. For example, inspections of plants and caring for plants (e.g. cutting plants) may require different operator light settings. The type of attention may be determined by identifying the tool carried by the operator, for example. This tool could be a pruning knife, for example.

Said at least one processor may be configured to determine operator information from said input, said operator information representing where said operator is looking at and/or comprising a position of said operator's head, of a part of said operator's head and/or of a hand of said operator, and determine said attention area of said operator based on said operator information. This allows the attention area to be determined relatively precisely.

Said operator information may further comprises a speed of said operator. This makes it possible to distinguish between a person standing still and a person simply walking by. No operating light settings or different operator light settings may be used in the latter case.

Said at least one processor may be configured to determine one or more adjacent areas within a certain distance of said operator from said input, said one or more adjacent areas being adjacent to said attention area, identify one or more adjustable light-blocking elements, e.g. curtains and/or blinds, between said operator and said one or more adjacent areas, and use said at least one control interface to close said one or more adjustable light-blocking elements. These adjustable light-blocking elements may be controlled to shield direct visibility of the light sources.

Said at least one processor may be configured to determine one or more adjacent areas within a certain distance of said operator from said input, said one or more adjacent areas being adjacent to said attention area, identify one or more adjacent light sources illuminating said one or more adjacent areas and use said at least one control interface to adjust one or more settings of said one or more adjacent light sources by switching off at least one of said one or more adjacent light sources, dimming at least one of said one or more adjacent light sources and/or adjusting a light emission spectrum of said one or more adjacent light sources. By adjusting the settings of the adjacent light sources, it is possible to stop them from harming the safety of the operator or being uncomfortable to the operator.

Said at least one processor may be configured to obtain a grow protocol associated with said attention area, said grow protocol comprising said grow light settings, and determine said operator light settings based on said grow light settings. This makes it possible to minimize the differences between the operator light settings and the grow light settings and thereby minimize the impact of the operator light settings on the grow of the plants. Preferably, the operator light settings are determined based on the grow settings associated with the currently applicable grow stage of the grow protocol.

Said at least one processor may be configured to use said at least one control interface to adjust said one or more settings of said one or more identified light sources from said grow light settings to said operator light settings by controlling said one or more identified light sources to adjust an intensity of one or more wavelength components of said grow light settings and/or add an intensity of a green wavelength component and/or add an intensity of a broad spectrum white component. Adjusting an intensity of a wavelength component of the grow light settings does not require that the wavelength component exists in the original and new grow light settings but may simply comprise increasing the intensity of the wavelength component from zero or decreasing the intensity of the wavelength component towards zero.

The operator light settings should help the operator perform his task, e.g. inspecting and/or caring for plants, and should not harm the safety of the operator. There are two aspects to be considered: (1) spectrum and (2) intensity. (1) Grow light settings typically do not comprise the entire visible spectrum and may comprise non-visible spectral components e.g. UV or IR. (2) Grow light settings may include very high intensities that are potentially harmful to the human eye. Preferably, either white light or green light is added to the grow light emission spectrum to create the operator light emission spectrum and/or the grow light is replaced by white light. Optionally, in the additive mode, the intensity of the grow light emission spectrum (or parts thereof) is reduced to adapt overall intensity to the human eye sensitivity and/or to avoid dangerous wavelength such as blue/UV for the human eye.

Said at least one processor may be configured to determine said operator light settings based on an ambient daylight level. This allows less intense operator light settings to be used in green houses during the day, for example.

Said at least one processor may be configured to determine an identifier of said operator and/or an identifier of a group to which said operator belongs from said input and determine said operator light setting based on light settings associated with said identifier of said operator and/or said identifier of said group. As a first example, operators may be able to define the light settings they prefer, e.g. the color temperature. As a second example, different operator light settings may be used for a group of operators that that inspects plants than for a group of operators that cares for plants. The operator or the group of operators may be identified by identifying the tool carried by the operator. This is possible if the same tool is not also carried by other operators or groups of operators.

Said at least one processor may be configured to use said at least one control interface to adjust said one or more settings of said one or more identified light sources gradually from said operator light settings to adjusted operator light settings, said adjusted operator light settings being more similar to said grow light settings than said operator light settings are similar to said grow light settings. This creates a gradual transition between normal operator light conditions (e.g. daylight-like light conditions) to grow light conditions to allow operators to get used to the different light (e.g. a lack of green) of grow light conditions. This is especially beneficial when applied upon the operator entering the (horticulture) grow area. "Similar" or "more similar" may refer to intensity and/or spectral components of the light.

In horticulture growth, plants are subjected to periods of light and darkness, reflecting day and night in their circadian rhythm. The response of plants to cycle of light and dark periods is known is photoperiodism. Operator tasks may be performed during the dark period in the plant's circadian rhythm, therewith disturbing their night. Therefor, in examples, the grow light settings may be darkness or 'no light'. The systems described herein may also be used to limit the influence of the use of operator light during the plant's circadian night on the growth of the plants, for example by extending the dark period or adjusting the grow light settings at the start of the light period, etc.

In a second aspect disclosed herein, a method of adjusting one or more settings of one or more identified light sources comprises receiving input from one or more sensors, determining an attention area of an operator from said input, identifying one or more light sources illuminating said attention area, and adjusting one or more settings of said one or more identified light sources from grow light settings to operator light settings. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a software code portion, the software code portion, when executed or processed by a computer, being configured to perform executable operations for adjusting one or more settings of one or more identified light sources.

The executable operations comprise receiving input from one or more sensors, determining an attention area of an operator from said input, identifying one or more light sources illuminating said attention area, and adjusting one or more settings of said one or more identified light sources from grow light settings to operator light settings.

As will be appreciated by one skilled in the art, aspects of the present invention may be embodied as a device, a method or a computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to examples of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various examples of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EXAMPLES

Figure 1:
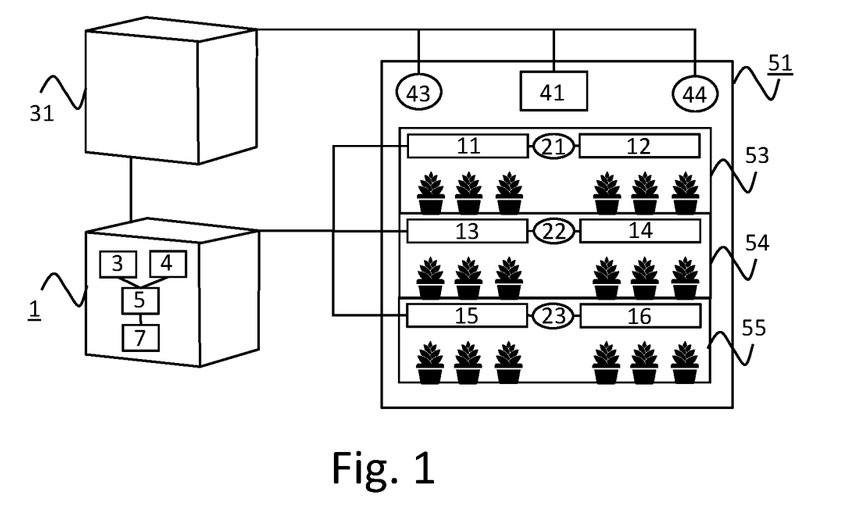
FIG. 1 is a block diagram of an example of the system and a first example of a rack of a vertical farm.

FIG. 1 shows an example of the system for adjusting one or more settings of one or more identified light sources: a light control computer 1. In the example of FIG. 1, the light sources are part of a vertical farm. In vertical farms, plants are grown in a very well-controlled environment. The climate (temperature, humidity, CO2 level) is optimal for grow and controlled by a climate control system, e.g. climate control computer 31. This also holds for the light conditions offered to the plants (light intensity, spectrum, and their dependence on the time of day and grow stage of the plant). The light conditions are controlled by a lighting control system, light control computer 1 in this example. The optimal grow conditions (typically climate conditions and light conditions) are described by a so-called grow protocol (typically comprising a climate protocol/recipe and a light protocol/recipe).

In the example of FIG. 1, light control computer 1 is used in a plant growing environment that comprises a vertical farm 51 of one rack with three layers 53-55. Each of the layers 53-55 comprises two segments. Layer 53 comprises two LED modules 11-12 (one per segment) and a light sensor 21. Layer 54 comprises two LED modules 13-14 (one per segment) and a light sensor 22. Layer 55 comprises two LED modules 15-16 (one per segment) and a light sensor 23. A rack of a vertical farm may be several meters high.

The vertical farm 51 further comprises two climate sensors 43-44 and a Heating, Ventilation and Air Conditioning (HVAC) system 41. In FIG. 1, HVAC system 41 is depicted centrally in the vertical farm 51. However, parts of the HVAC system 41 may be located on each of layers 53-55, e.g. in order to provide ventilation to the plants. The climate sensors 43-44 may comprise a temperature sensor and a CO2 sensor, for example. The climate control computer 31 receives sensor data from the two climate sensors 43-44 and controls the HVAC system 41 based on this sensor data.

The LED modules 11-16 are controlled by the light control computer 1. The light control computer 1 comprises a receiver 3, a transmitter 4, a processor 5, and memory 7. The processor 5 is configured to use the receiver 3 to receive input from sensor modules 21-23. Each of the sensor modules 21-23 comprises, in addition to a light sensor or alternative to a light sensor, a PIR sensor. The processor 5 is configured to determine operator information from the input. In the example of FIG. 1, movement of a person near one of the layers 53-55 is detected. This is typically movement of the operator's head or hand. In alternative example, one or more cameras are used instead of PIR sensors. In this alternative example, operator information may be determined that represents where the operator is looking at and/or that comprises a position of the operator's head, of a part of the operator's head and/or of a hand of the operator.

The processor 5 is further configured to determine an attention area of an operator from the operator information, identify one or more light sources illuminating the attention area, and use the transmitter 4 to adjust one or more settings of the one or more identified light sources from grow light settings to operator light settings. For example, the determined attention area may be layer 54 and the settings of light sources 13 and 14 may then be adjusted from grow light settings to operator light settings. The operator is normally a human, but may also be a robot. The operator may be a robotic operator that is dependent on light to operate, such a drone equipped with one or more cameras.

In the example of FIG. 1, the processor 5 is also configured to use the receiver 3 to receive further input from the one or more sensors 21-23, determine that no further attention by the operator is needed in the attention area from the further input, and use the transmitter 4 to adjust the one or more settings of the one or more identified light sources from the operator light settings to the grow light settings or to new grow light settings upon determining that no further attention by the operator is needed in the attention area. For example, the further attention area may be layer 53 or layer 55.

In this way, the light control computer 1 can ensure that there is suitable light (e.g. a suitable intensity in a suitable spectrum) for the operator to examine and/or care for the crops of his choosing, while crops he does not want to examine or care for are unaffected, i.e. these crops can still be lit with spectrum optimal for their grow and development. In the example of FIG. 1, the light settings are chosen so as not to be harmful or uncomfortable to the operator. When the operator stands near light sources that could pose a risk to the human eye or could cause discomfort, which could be light sources illuminating the attention area or light sources illuminating adjacent areas, the light control computer 1 decides what must be done:
- the light could be dimmed;
- the spectrum could be changed to, for example, less light in the blue region and more in the green and red regions;
- electrically controllable blinds could be triggered to hide the direct view of the light sources.

This results in a safe and comfortable application of the light sources (e.g. crop lighting is adjusted to the human eye sensitivity, light levels are adjusted to optimal comfort of people). It also has the benefit of lighting the crops close to where the human operator is with a spectrum comfortable to the human operator. This makes it easier to judge the quality of the plants and fruits and inspect for diseases or pests. When very high doses of infra-red are present, this could also be dimmed.

In the example of FIG. 1, the lighting control system consists of the local light control computer 1 and the climate control system consists of the local climate control computer 31. In an alternative example, the lighting control system and/or the climate control system may alternatively or additionally have remote components, e.g. applications running on an Internet server.

In the example of the computer 1 shown in FIG. 1, the computer 1 comprises one processor 5. In an alternative example, the computer 1 comprises multiple processors. The processor 5 may be a general-purpose processor, e.g. from Intel or AMD, or an application-specific processor. The processor 5 may run a Windows or Unix-based operating system for example. The memory 7 may comprise one or more memory units. The memory 7 may comprise one or more hard disks and/or solid-state memory, for example. The memory 7 may be used to store an operating system, applications and application data, for example.

The receiver 3 and the transmitter 4 may use one or more wired and/or wireless communication technologies to communicate with the LED modules 11-16 and the sensors 21-23, for example. In an alternative example, multiple receivers and/or multiple transmitters are used in light control computer 1 instead of a single receiver and a single transmitter. In the example shown in FIG. 1, separate receivers and separate transmitters are used. In an alternative example, the receiver 3 and the transmitter 4 are combined into a transceiver. The computer 1 may comprise other components typical for a computer such as a power connector and a display. The invention may be implemented using a computer program running on one or more processors.

In the example of FIG. 1, the system of the invention is a computer. In an alternative example, the system of the invention is a different device. In the example of FIG. 1, the system of the invention comprises a single device. In an alternative example, the system of the invention comprises a plurality of devices. In the example of FIG. 1, the computer 1 uses transmitters to control components in the vertical farm. In an alternative example, the computer 1 uses only analog wires to control the components in the vertical farm.

Figure 2:
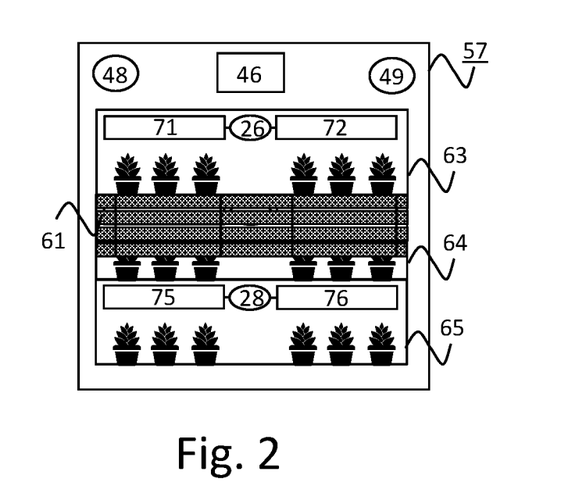
FIG. 2 is a block diagram of a second example of a rack of a vertical farm which comprises blinds.

FIG. 2 shows a second example of a rack of a vertical farm: rack 57. Like rack 51, the rack 57 comprises three layers (63-65), six LED modules (of which LED modules 71-72 and 75-76 are visible in FIG. 2), and three sensor modules (of which sensor modules 26 and 28 are visible in FIG. 2). Like rack 51, the rack 57 comprises two climate sensors (48-49) and an HVAC system (46). The difference between racks 51 and 57 is the presence of controllable blinds 61 in rack 57. In an alternative example, the blinds 61 may be replaced with another type of adjustable light-blocking elements, e.g. curtains.

Blinds 61 are controlled by a further example of the system in which the processor 5 is configured to determine one or more adjacent areas within a certain distance of the operator from the input, identify one or more adjustable light-blocking elements, i.e. blinds 61, between the operator and the one or more adjacent areas, and use the transmitter 4 to close the one or more adjustable light-blocking elements. The one or more adjacent areas are adjacent to the attention area.

Figure 3:
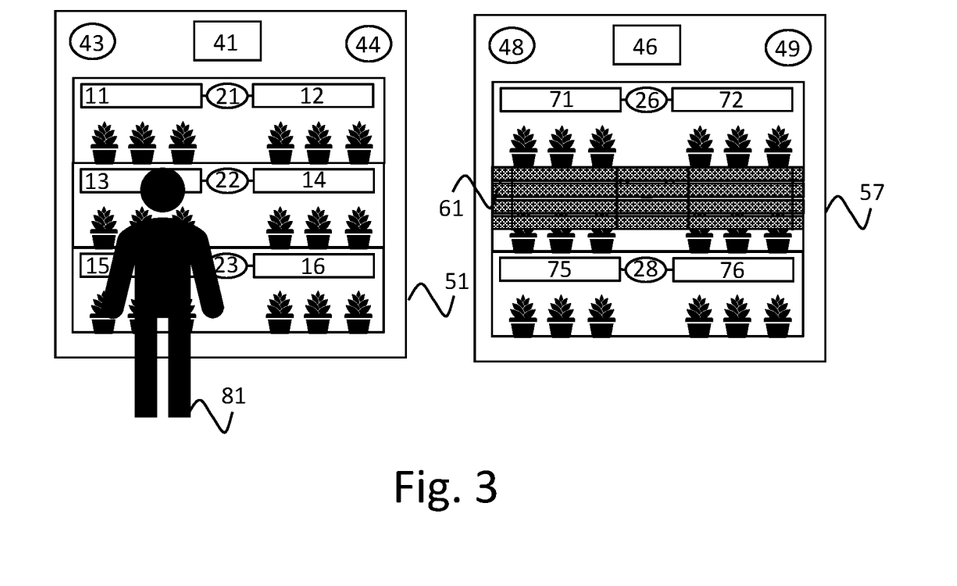
FIG. 3 shows an example of an operator standing still in front of the rack of FIG. 1.

FIG. 3 shows an example of an operator 81 standing still in front of the rack of FIG. 2. As described in relation to FIG. 1, the processor 5 of the light control computer 1 is configured to determine operator information from the input and determine the attention area of the operator from the operator information. The light control computer 1 decides what to do when the sensors indicate that the operator has a certain attention area. In a vertical farm, this typically depends on the crop, the x,y,z position of the operator's eyes, the x,y,z position of each controllable light source (group), and optionally the other disturbances that have already occurred that day.

By determining the speed of the operator 81 as part of the operator information, it becomes possible to determine whether detection of a person by the PIR sensor of sensor module 22 means that that operator 81 is paying attention to layer 54 (see also FIG. 1) or not. If the speed exceeds a certain threshold, no attention area is determined. If not, the layer 54 is determined to be the attention area.

In the example of FIG. 3, the operator 81 is standing still and layer 54 is therefore determined to be the attention area. In this case, the (movable) blinds 61 may be lowered to protect the operator's eyes from the light emitted by the LED modules on layer 64 adjacent to layer 54 (see also FIG. 2) by hiding the middle layer of rack 57 from view. The LED modules 15, 16, 75 and 76 on the bottom layers may be left unchanged, as the operator 81 does not have direct view of these lamps.

In the further example of the system, described in relation to FIG. 2, or in another example of the system, the processor 5 is configured to determine one or more adjacent areas within a certain distance of the operator from the input, identify one or more adjacent light sources illuminating the one or more adjacent areas and use the transmitter 4 to adjust one or more settings of the one or more adjacent light sources by switching off at least one of the one or more adjacent light sources, dimming at least one of the one or more adjacent light sources and/or adjusting a light emission spectrum of the one or more adjacent light sources. The one or more adjacent areas are adjacent to the attention area. For example, the LED modules 11, 12, 71 and 72 of the top layers may be dimmed to protect the operator's eyes from the light emitted by LED modules 11, 12, 71 and 72.

Figure 4:
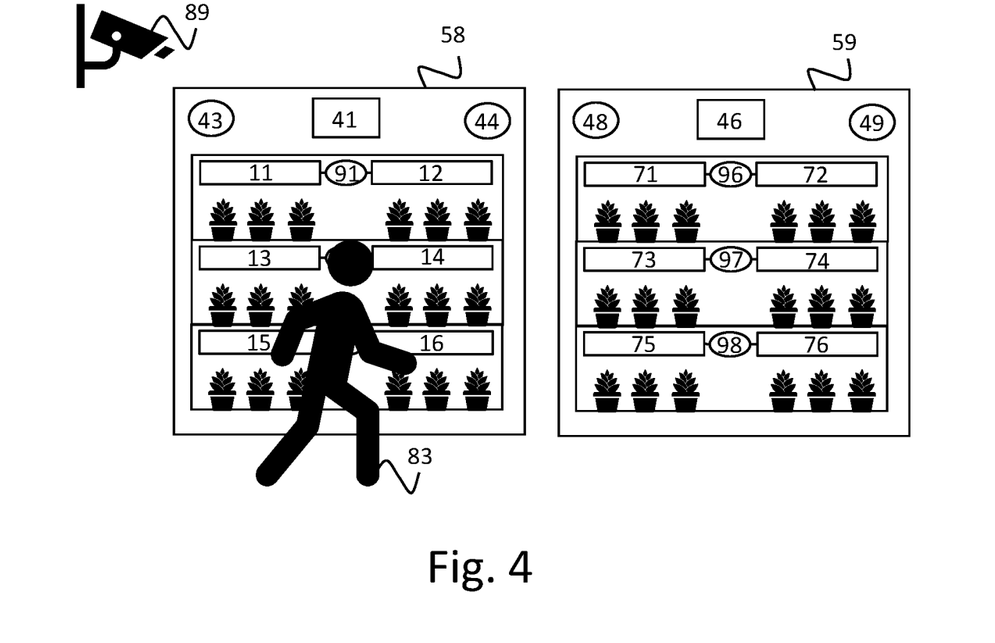
FIG. 4 shows an example of an operator walking past a third example of a rack of a vertical farm.

FIG. 4 shows an example of an operator 83 walking past a third example of a rack of a vertical farm: rack 58. Since the operator information further comprises the speed of the operator 83 and the speed of the operator 83 exceeds the above-mentioned threshold, no attention area is determined.

Racks 58 and 59 are similar to each other, but they are slightly different than rack 51 of FIG. 1. While the sensor modules 21-23 in rack 51 comprise PIR sensors, the sensor modules in racks 58 and 59, e.g. sensor modules 91,96-98, do not comprise PIR sensors. Instead, a camera 89 is used to determine the attention area of the operator 83. This makes it possible to determine more advanced operator information from the sensor input and the attention area can then be determined from this more advanced operator information. For example, the operator information may represent where the operator 83 is looking at and/or comprise a position of the operator's head, of a part of the operator's head and/or of a hand of the operator 83.

Figure 5:
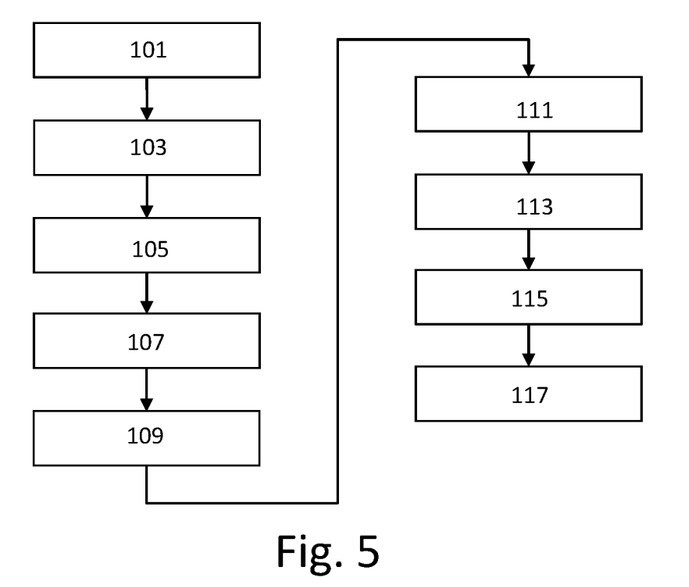
FIG. 5 is a flow diagram of a first example of the method.

A first example of the method of adjusting one or more settings of one or more identified light sources is shown in FIG. 5. A step 101 comprises receiving input from one or more sensors. A step 103 comprises determining an attention area of an operator from the input. A step 105 comprises identifying one or more light sources illuminating the attention area. A step 107 comprises determining operator light settings. A step 109 comprises adjusting one or more settings of the one or more identified light sources from their current settings, i.e. grow light settings, to the operator light settings.

In step 109, the one or more settings of the one or more identified light sources may be adjusted from the grow light settings to the operator light settings by controlling the one or more identified light sources to adjust an intensity of one or more wavelength components of the grow light settings and/or add an intensity of a green wavelength component and/or add an intensity of a broad spectrum white component.

In the example of FIG. 5, the one or more identified light sources will keep the operator settings determined in step 107 until they switch back to grow light settings. In an alternative example, the one or more settings of the one or more identified light sources are adjusted gradually from the operator light settings to adjusted operator light settings while the operator has the same attention area. The adjusted operator light settings are more similar to the grow light settings than the operator light settings are similar to the grow light settings, but not harmful or uncomfortable to the operator.

This is especially beneficial if the operator has just entered the vertical farm. In order for plants to grow as efficiently as possible in a vertical farm, the plants often get only red and blue light, and no or only a limited amount of green. For the grow and development of the plants that is no problem, since they mainly reflect green light anyway. For humans the missing of the reflected green light makes it harder to recognize the plants. The human eye adapts to different light conditions very efficiently. When there is a lack of green light, the eyes get more sensitive to green. When returning to an environment with a normal amount of green light in it again, the eyes interpret this as a huge overdose of green light. After a few minutes the eye gets used to the new situation again. Human eyes need time to accommodate to artificial light conditions whereby the light spectrum is optimized to efficiently grown plants.

When the operator had just entered the vertical farm, he is used to normal light conditions and therefore requires normal light settings to examine and/or care for crops. Since these normal light settings may impact the grow of the crops, it may be beneficial to let the operator get used to adjusted operator light settings that have a smaller impact on the grow of the crops or increase energy efficiency (e.g. with less green light), but that still provide suitable light to the operator and are not harmful to the operator.

Alternatively, a separate area at the entrance of the vertical farm may be used to let the operator get used to operator light settings that do not correspond to normal light conditions. In this case, the light transition will be generated in the area where humans enter the grow area. This may be an adjacent area, or a part of the grow area near the entrance where the transition is temporarily activated upon detecting humans entering. This same principle can also be applied when the people leave the room again, so they can get used to the light in the outside world again. The light transition can be realized in various ways:
  dynamic: upon detecting humans entering the entrance area, the light gradually changes from normal to (non-harmful) grow light conditions
  spatial: the transition from normal light to (non-harmful) grow light is mapped spatially on multiple light sources, for instance, there may be a corridor (hallway) before entering the grow area, and the transition may be spatially distributed over light sources in the corridor (optionally the user position is detected in order to optimize the mapping).

A step 111 comprises receiving further input from the one or more sensors and/or one or more further sensors. A step 113 comprises determining that no further attention by the operator is needed in the attention area from the further input. A step 115 comprises determining grow light settings, e.g. the previous grow light settings or new grow light settings. A step 117 comprises adjusting the one or more settings of the one or more identified light sources from the operator light settings to the grow light settings upon determining that no further attention by the operator is needed in the attention area.

Figure 6:
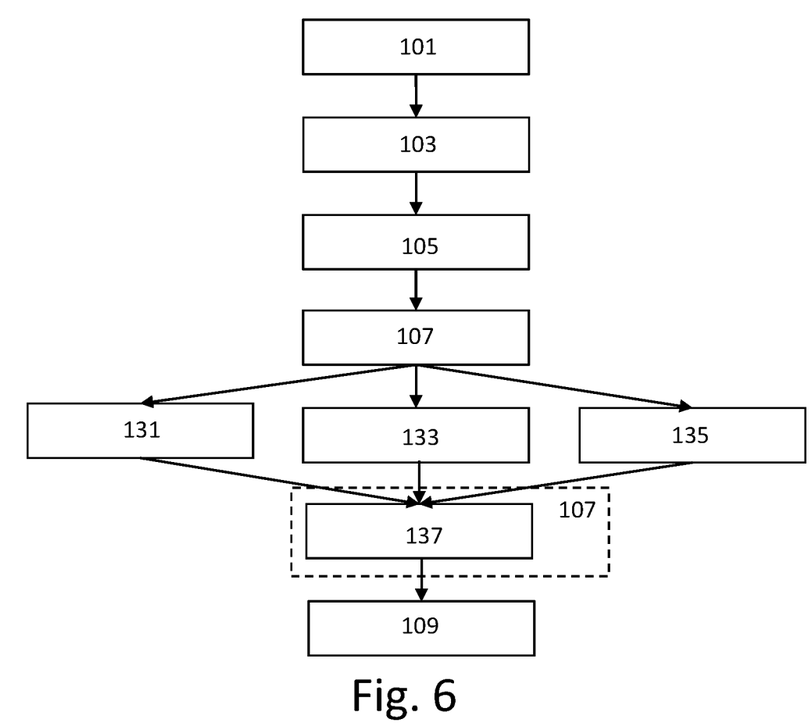
FIG. 6 is a flow diagram of a second example of the method.

A second example of the method of adjusting one or more settings of one or more identified light sources is shown in FIG. 6. In the example of FIG. 6, one or more of steps 131, 133 and 135 are performed between steps 107 and 109 of FIG. 5 and step 107 of FIG. 5 is implemented by a step 137.

Step 131 comprises determining a type of attention required from the operator in the attention area. If step 131 is performed, step 137 comprises determining the operator light settings based on the determined type of attention (if determinable). Step 133 comprises determining an ambient daylight level. Step 133 may be performed for a greenhouse, for example. In vertical farms, there is normally no daylight. If step 133 is performed, step 137 comprises determining the operator light settings based on the ambient daylight level (if determinable). Step 135 comprises determining an identifier of the operator and/or an identifier of a group to which the operator belongs from the input. If step 135 is performed, step 137 comprises determining the operator light setting based on light settings associated with the identifier of the operator and/or the identifier of the group (if determinable). If steps 131, 133 and 135 are all performed, step 137 comprises determining the operator light settings based on the determined type of attention (if determinable), based on the ambient daylight level (if determinable), and based on light settings associated with the identifier of the operator and/or the identifier of the group (if determinable).

In the example of FIG. 6, steps 111 to 117 of FIG. 5 have been omitted, but in an alternative example, steps 111 to 117 of FIG. 5 are performed after step 109 of FIG. 6.

Figure 7:
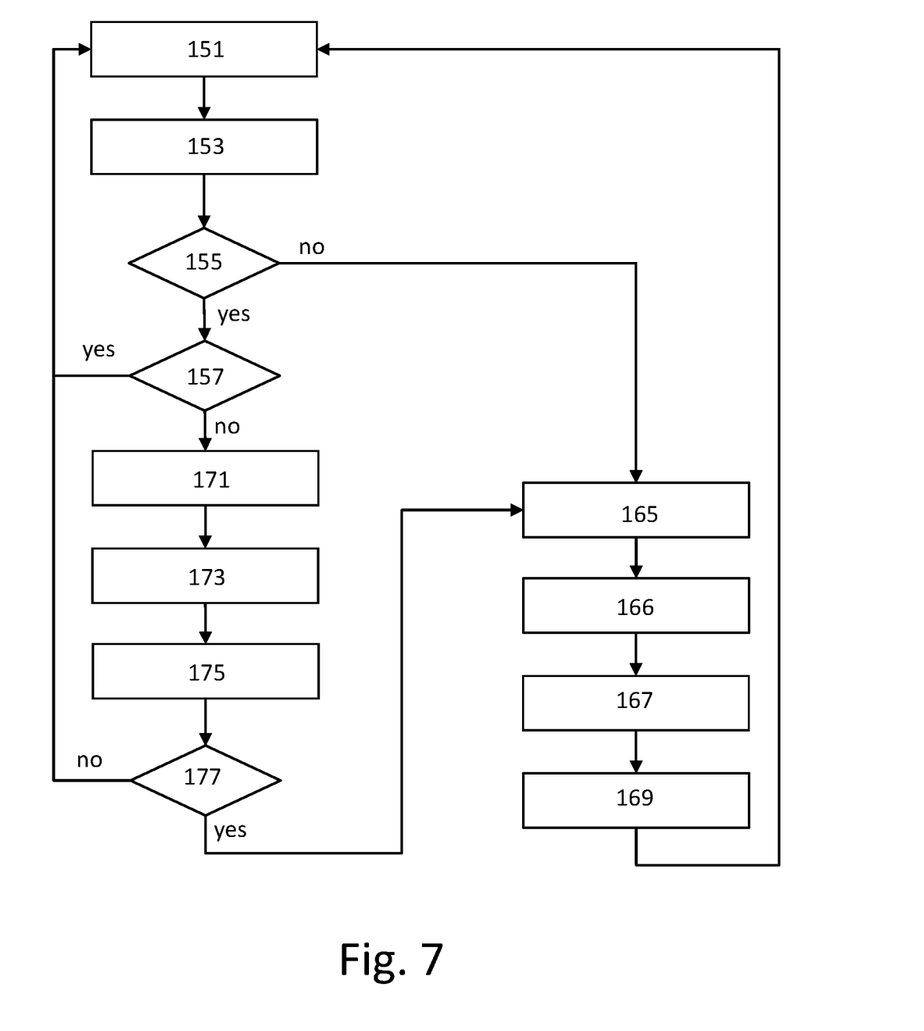
FIG. 7 is a flow diagram of a third example of the method.

A third example of the method of adjusting one or more settings of one or more identified light sources is shown in FIG. 7. Before the method of FIG. 7 is performed, one or more grow protocols have been activated for the crops in the vertical farm and when no operator is present, grow light settings are used by the horticulture grow light sources in the vertical farm.

A step 151 comprises receiving input from one or more sensors. One or more of these sensors may be located at the entrance(s) of the vertical farm. Depending on the cycle of the grow/light protocol, the light control computer may provide an alarm signal mentioning the danger to enter the facility for the crop. This is beneficial if a crop is sensitive to sudden light changes or presence of light during the dark period. If the operator still proceeds to examine and/or care for a crop, the light may still be adapted from grow light settings to operator light settings, e.g. to prevent human harm.

A step 153 comprises determining an attention area of an operator from the input. This may involve detecting the presence of the operator, for example, by means of a presence-sensor array, one or more camera(s), or based on RF beacons able to detect proximity or the position of a personal RF device. Personal RF-detectable devices may be an RFID or NFC badge, a personal mobile or wearable device, or an identifiable operator tool or appliance. It is also possible that those detectable devices are associated with a specific task or operation, and that light settings are defined for each of those operations. Additionally, the position of the face/eyes or hand of the operator may be detected, and gaze detection may be performed.

Detecting the position over time can be used to determine operator speed which may indicate whether the operator is static or dynamic and hence needs operator light or not, as described in relation to FIGS. 3 and 4. For instance, a user can be detected to be standing still (indicating that he may be inspecting or taking some other action) or moving fast past the plant trays (indicating that he is just passing by). Operator position may be detected by or associated with the position of a personal (mobile or wearable) device or by an operator tool or appliance (e.g. stair, pruning knife).

In the case that more (sophisticated) sensing means are available, it may also be possible to detect the attention area more precisely. For instance, during the operation task the operator may move within a small area (e.g. within 1 m) or within a larger area (e.g. 3-5 m). In a similar way, the operator's gaze vector may be determined, and a gaze area size can be determined based on the aggregated gaze vector data. It may also be possible to determine the attention area more precisely based on the task the operator is performing. For example, the operator may be able to define the size of an attention area for a specific task.

The result of step 153 might be that no attention area could be determined (e.g. because the operator is not looking at any of the layers of a vertical farm).

A step 155 comprises checking whether it was possible to determine an attention area in the directly preceding iteration of step 153. This attention area will be referred to as "preceding attention area" hereinafter. If no attention area was successfully determined in a directly preceding iteration of step 153 (e.g. the operator only just entered the vertical farm or the method is in its first iteration), then there is no need to adjust light sources back to grow light settings and a step 165 is performed next.

Step 165 comprises identifying one or more light sources illuminating the attention area that was just determined in step 153 (referred to as "current attention area" hereinafter). For example, a nearest plant tray or a plant or plant group where the operator is detected to be gazing at (or is anticipated to move his gaze towards) may be identified, after which co-located light sources are selected.

A step 166 comprises obtaining a grow protocol associated with the current attention area. The grow protocol comprises grow light settings. A step 167 comprises determining the operator light settings based on the grow light settings. For instance, the system may try to arbitrate between the needs of the plant and the needs of the operator such that the differences between the operator light and grow light settings are minimized. It is also possible, that initially, the light is optimized for the operator, whereas (after a pre-defined time period) gradually the operator light is changed back towards the grow light settings. This is advantageous, as this enables the operator to adjust to the grow light settings in a gradual way, while it can minimize the deviation of the light output from the grow light settings.

The grow light settings, and therefore the operator light settings, may depend on the type of crop/plant. For example, green operator light may be preferred for a chrysanthemum. The operator light settings may further depend on light settings associated with the identified operator and/or further detected properties. For instance, the operator may have specified preferred light properties for a given task such as light settings, effect size, time-out, transition. In the case of plant growth in greenhouses, the operator light settings might also depend on the ambient daylight level. So dependent on detected or determined ambient light conditions at the operator's current position, the grow light sources may need to only partially contribute to create the desired light conditions for the operator.

A step 169 comprises adjusting one or more settings of the one or more identified light sources from their current settings, i.e. the grow light settings, to the operator light settings. The operator light may be modulated in order to transmit information associated with the grow/light protocol or with the plant (e.g. inspection or harvesting instructions) to a mobile operator device. The mobile device may have a light or vision sensor and processing means able to detect and decode the modulated (VLC) lighting signal. By only modulating when (authorized) operators are nearby, it can be prevented that recipe-related information is retrieved by non-authorized people.

Step 151 is repeated after step 169 and thus a next iteration of the method is performed, and further input is received, in the next iteration of step 151 (at a later time).

If the result of the check in step 155 is that it was possible to determine an attention area in the directly preceding iteration of step 153, a step 157 is performed. Step 157 comprises checking whether the current and preceding attention areas are the same. If they are the same, no action is currently needed and step 151 is repeated. If they are not the same, then this means that that no further attention by the operator is needed in the preceding attention area and a step 171 is therefore performed.

Step 171 comprises determining a duration of use of the operator light settings in the preceding attention area.

A step 173 comprises determining grow light settings, e.g. the previous grow light settings or new grow light settings. In step 173, the new grow light settings and/or a period during which the previous grow light settings or the new grow light settings need to be used after applying the operator light settings are determined based on the grow light settings, the operator light settings and the duration.

A step 175 comprises adjusting the one or more settings of the one or more identified light sources in the preceding attention area (identified in the previous iteration of step 165) from the operator light settings to the grow light settings. Thus, once the operator moves away from the selected light sources, the light protocol is resumed. This can either happen instantly or gradually (e.g. based on the distance towards the operator position).

In the example of FIG. 7, in step 173, the resumed grow light recipe is adjusted in order to compensate for the interruption of the operator light, based on properties of the operator light setting (e.g. duration, differences). In case the operator light settings are dimmed compared to the grow light settings, depending on the time/duration of lighting changes, the light settings of the light protocol may be automatically adjusted to match the required DLI (day light integral) required by the light protocol.

For instance, a light deficit may be determined, and this light deficit may be compensated in one or more of the following manners:
 a) render the grow light longer on the day the interruption took place;
 b) render the grow light longer at the end of grow protocol if this is acceptable to the grower;
 c) render the grow light at a higher intensity if not already at maximum.

A step 177 is performed after step 175. Step 177 comprises checking whether it was possible to determine an attention area in the current iteration of step 153. If this was possible, step 165 is performed next. If this was not possible, then step 151 is repeated.

Figure 8:
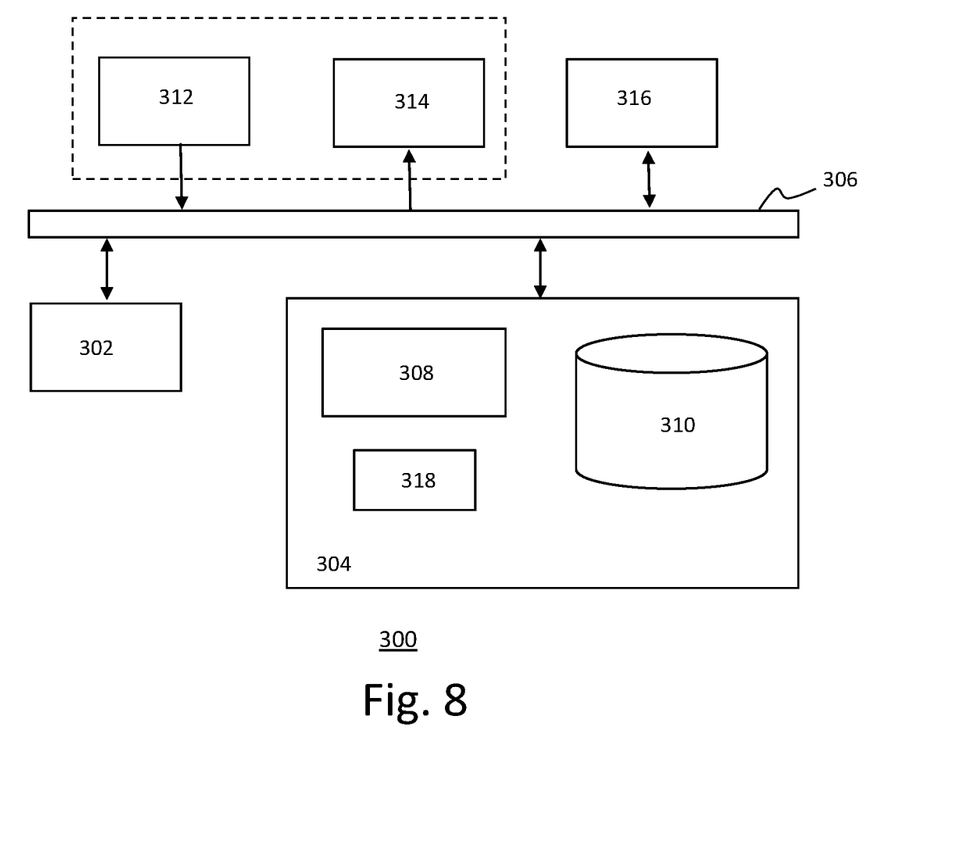
FIG. 8 is a block diagram of an exemplary data processing system for performing the method of the invention.

FIG. 8 depicts a block diagram illustrating an exemplary data processing system that may perform the method as described with reference to FIGS. 5 to 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an example, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an example, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various examples, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various examples of the invention may be implemented as a program product for use with a computer system, where the program(s) of the program product define functions of the examples (including the methods described herein). In one example, the program(s) can be contained on a variety of non-transitory computer-readable storage media, where, as used herein, the expression "non-transitory computer readable storage media" comprises all computer-readable media, with the sole exception being a transitory, propagating signal. In another example, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular examples only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of examples of the present invention has been presented for purposes of illustration, but is not intended to be exhaustive or limited to the implementations in the form disclosed. Many modifications and variations will be apparent to those of ordinary skill in the art without departing from the scope and spirit of the present invention. The examples were chosen and described in order to best explain the principles and some practical applications of the present invention, and to enable others of ordinary skill in the art to understand the present invention for various examples with various modifications as are suited to the particular use contemplated.

The invention claimed is:

1. A system for adjusting one or more settings of one or more identified light sources for horticulture growth of plants or crops, comprising:
   at least one input interface;
   at least one control interface; and
   at least one processor configured to:
   use said at least one input interface to receive an input from one or more sensors; determine, from said input, an attention area of an operator where performance of an operator task on or related to one or more plants or crops is needed; identify one or more light sources illuminating said attention area; and use said at least one control interface to adjust one or more settings of said one or more identified light sources from grow light settings for growing the plants or crops to operator light settings for performing the operator task; and
   use said at least one input interface to receive a further input from said one or more sensors and/or one or more further sensors; determine, from said further input, that no further attention by said operator is needed in said attention area; and use said at least one control interface to adjust said one or more settings of said one or more identified light sources from said operator light settings to said grow light settings or to new grow light settings upon determining that no further attention by said operator is needed in said attention area;
   wherein the at least one processor is further configured to determine a duration of use of said operator light settings; and determine said new grow light settings and/or a period during which said grow light settings or said new grow light settings need to be used after applying said operator light settings based on said grow light settings, said operator light settings and said duration.

2. The system as claimed in claim 1, wherein said at least one processor is configured to:
   determine a further attention area of said operator from said further input,
   identify one or more further light sources illuminating said further attention area, and
   use said at least one control interface to adjust one or more settings of said one or more identified further light sources from further grow light settings to further operator light settings.

3. The system as claimed in claim 1, wherein said at least one processor is configured to:
   determine a type of attention required from said operator in said attention area, and
   determine said operator light settings based on said determined type of attention.

4. The system as claimed in claim 1, wherein said at least one processor is configured to determine operator information from said input, said operator information representing where said operator is looking at and/or comprising a position of said operator's head, of a part of said operator's head and/or of a hand of said operator, and determine said attention area of said operator based on said operator information.

5. The system as claimed in claim 4, wherein said operator information further comprises a speed of said operator.

6. The system as claimed in claim 1, wherein said at least one processor is configured to determine one or more adjacent areas within a certain distance of said operator from said input, said one or more adjacent areas being adjacent to said attention area, identify one or more adjustable light-blocking elements between said operator and said one or more adjacent areas, and use said at least one control interface to close said one or more adjustable light-blocking elements.

7. The system as claimed in claim 1, wherein said at least one processor is configured to determine one or more adjacent areas within a certain distance of said operator from said input, said one or more adjacent areas being adjacent to said attention area, identify one or more adjacent light sources illuminating said one or more adjacent areas and use said at least one control interface to adjust one or more settings of said one or more adjacent light sources by switching off at least one of said one or more adjacent light sources, dimming at least one of said one or more adjacent light sources and/or adjusting a light emission spectrum of said one or more adjacent light sources.

8. The system as claimed in claim 1, wherein said at least one processor is configured to:
- obtain a grow protocol for growing the plants or crops associated with said attention area, said grow protocol comprising said grow light settings, and
- determine said operator light settings based on said grow light settings.

9. The system as claimed in claim 8, wherein said at least one processor is configured to use said at least one control interface to adjust said one or more settings of said one or more identified light sources from said grow light settings to said operator light settings by controlling said one or more identified light sources to adjust an intensity of one or more wavelength components of said grow light settings and/or add an intensity of a green wavelength component and/or add an intensity of a broad spectrum white component.

10. The system as claimed in claim 1, wherein said at least one processor is configured to determine said operator light settings based on an ambient daylight level.

11. The system as claimed in claim 1, wherein said at least one processor is configured to determine an identifier of said operator and/or an identifier of a group to which said operator belongs from said input and determine said operator light setting based on light settings associated with said identifier of said operator and/or said identifier of said group.

12. The system as claimed in claim 1, wherein the at least one processor is configured to use said at least one control interface to adjust said one or more settings of said one or more identified light sources gradually from said operator light settings to adjusted operator light settings, said adjusted operator light settings being more similar to said grow light settings than said operator light settings are similar to said grow light settings.

13. The system as claimed in claim 1, wherein said attention area is a part of a layer in a vertical horticulture farm and said at least one control interface is configured to adjust one or more settings of said one or more identified light sources from grow light settings for growing the plants or crops to operator light settings for performing the operator task only in said part of said layer in said vertical horticulture farm.

14. A method of adjusting one or more settings of one or more identified light sources for horticulture growth of plants or crops, said method comprising:
- receiving an input from one or more sensors; determining, from said input, an attention area of an operator where performance of an operator task on or related to one or more plants or crops is needed from said input; identifying one or more light sources illuminating said attention area; and adjusting one or more settings of said one or more identified light sources from grow light settings for growing the plants or crops to operator light settings for performing the operator task;
- receiving a further input from said one or more sensors and/or one or more further sensors; determining, from said further input, that no further attention by said operator is needed in said attention area; and using said at least one control interface to adjust said one or more settings of said one or more identified light sources from said operator light settings to said grow light settings or to new grow light settings upon determining that no further attention by said operator is needed in said attention area; and
- determining a duration of use of said operator light settings; and determine said new grow light settings and/or a period during which said grow light settings or said new grow light settings need to be used after applying said operator light settings based on said grow light settings, said operator light settings and said duration.

15. A non-transitory computer readable medium comprising instructions, the instructions, when executed by a processor causes the processor to perform the method of claim 14.

* * * * *